(12) United States Patent
Zhang et al.

(10) Patent No.: US 10,757,241 B2
(45) Date of Patent: Aug. 25, 2020

(54) METHOD AND SYSTEM FOR DYNAMICALLY CHANGING A HEADER SPACE IN A GRAPHICAL USER INTERFACE

(71) Applicant: OATH INC., New York, NY (US)

(72) Inventors: Renhui Zhang, Bellevue, WA (US); Maximillion Zhaohong Mai, San Jose, CA (US)

(73) Assignee: OATH INC., New York, NY (US)

( * ) Notice: Subject to any disclaimer, the term of this patent is extended or adjusted under 35 U.S.C. 154(b) by 530 days.

(21) Appl. No.: 13/952,734

(22) Filed: Jul. 29, 2013

(65) Prior Publication Data

US 2015/0033132 A1 Jan. 29, 2015

(51) Int. Cl.
*G06F 3/0481* (2013.01)
*H04M 1/725* (2006.01)
(Continued)

(52) U.S. Cl.
CPC ...... *H04M 1/72522* (2013.01); *G06F 3/0481* (2013.01); *G06F 40/106* (2020.01);
(Continued)

(58) Field of Classification Search
CPC ........... H04L 41/22; G06F 2203/04803; G06F 17/212; G06F 17/2241; G06F 3/0481;
(Continued)

(56) References Cited

U.S. PATENT DOCUMENTS 6,912,694 B1 * 6/2005 Harrison et al. ............... 715/784
7,181,585 B2 2/2007 Abrashkevich et al.
(Continued)

FOREIGN PATENT DOCUMENTS

| KR | 10-2003-0008944 | 1/2003 |
| KR | 10-2010-0074568 | 7/2010 |
| KR | 101314850 B1 * | 10/2013 |

OTHER PUBLICATIONS

Stackoverflow, "How to add a multiline title bar in UINavigationController", <http://stackoverflow.com/questions/12985401/how-to-add-a-multiline-title-bar-in-uinavigationcontroller>, Oct. 20, 2012, 3 pages.*
(Continued)

*Primary Examiner* — Jeanette J Parker
(74) *Attorney, Agent, or Firm* — James J. DeCarlo; Greenberg Traurig, LLP

(57) ABSTRACT

Disclosed is a method and system for transmitting, by a processor to a client device, a software application (e.g., a mobile app or a web page) configured to load, by a computer processor of the client device, a graphical user interface (GUI), the GUI including a header space and a content display space. The software application is further configured to display, by the computer processor, the GUI in a first frame, detect, by the computer processor, user interaction with content displayed in the content display space of the GUI, compare, by the computer processor, the user interaction with a set of stored user interactions, and, based on the comparing, change, by the computer processor, the header space in the GUI in the first frame.

24 Claims, 11 Drawing Sheets

(51) Int. Cl.
*H04W 4/21* (2018.01)
*H04W 4/18* (2009.01)
*G06F 40/106* (2020.01)
*G06F 40/137* (2020.01)

(52) U.S. Cl.
CPC ............ *G06F 40/137* (2020.01); *H04W 4/18* (2013.01); *H04W 4/21* (2018.02); *G06F 2203/04803* (2013.01)

(58) Field of Classification Search
CPC ...... G06F 3/048; G06F 40/106; G06F 40/137; H04M 1/72522; H04W 4/18; H04W 4/21
See application file for complete search history.

(56) References Cited

U.S. PATENT DOCUMENTS

| | | | | |
|---|---|---|---|---|
| 8,743,151 | B1 * | 6/2014 | Fulcher | G06F 3/04817 345/684 |
| 9,015,207 | B2 * | 4/2015 | Foit | 707/805 |
| 2004/0141011 | A1 * | 7/2004 | Smethers | G06F 3/0482 715/810 |
| 2006/0069694 | A1 * | 3/2006 | Rossi et al. | 707/101 |
| 2006/0265653 | A1 | 11/2006 | Paasonen et al. | |
| 2010/0050076 | A1 * | 2/2010 | Roth | G06F 3/04883 715/702 |
| 2011/0199318 | A1 | 8/2011 | Fong et al. | |
| 2011/0265028 | A1 * | 10/2011 | Hong et al. | 715/779 |
| 2011/0291964 | A1 * | 12/2011 | Chambers | G06F 1/1616 345/173 |
| 2012/0324507 | A1 * | 12/2012 | Weber | 725/37 |
| 2013/0227468 | A1 * | 8/2013 | Wu | G06F 3/0488 715/786 |
| 2015/0007086 | A1 * | 1/2015 | Weitzman et al. | 715/772 |

OTHER PUBLICATIONS http://www.yelp.com/yelpmobile visited Jul. 29, 2013; 1 pages.
www.yelp.com visited Jul. 29, 2013; 3 pages.
Notification of Transmittal of the International Search Report and the Written Opinion of the International Searching Authority, or the Declaration for PCT/US2014/046346 dated Oct. 30, 2014; 10 pages.

* cited by examiner

Fig. 4

METHOD AND SYSTEM FOR DYNAMICALLY CHANGING A HEADER SPACE IN A GRAPHICAL USER INTERFACE

FIELD

The present disclosure relates to a user interface, and more specifically to a mobile header bar or header space that dynamically changes in response to user interaction.

BACKGROUND

In today's mobile applications, the top area of the screen (often referred to as the header bar or header space or title bar) is typically used for navigation purposes or branding purposes. For example, a developer of a mobile application (or "app") usually places the company name (and/or logo) of the company that makes the app or places the product (e.g., app) title, name, or logo at the top of the screen when the app executes and is displayed on the screen of a mobile device. Alternatively, the developer may place a navigation bar at the top of the screen to enable the user to navigate from one screen to the next or to navigate back one screen in the app.

The developer may also use branding information (e.g., company name/logo or product name/logo) as a header bar on a first screen of the app and then use a navigation bar on a second or additional screen of the app. Thus, when the user initially executes the app on his mobile device, the app displays a title bar in the first screen. When the user navigates to a second screen, the app may display a navigation bar.

SUMMARY

The changing of the header bar in a mobile app from a company name or other branding information to a navigation bar from screen to screen can be confusing for a user, is inconsistent, and may clutter the user interface.

Further, information may be lost due to the static nature of the header bar. For example, suppose a user is reading text (e.g., an article) via an app. As the user scrolls the text to access additional information in the article, the top portion of the article, which usually includes the title of the article, typically scrolls off the screen. If the user wants to again look at the title, the user usually has to scroll back so that the beginning portion of the article is displayed. This is often burdensome for the user.

In one aspect, a header space of a software application dynamically changes in a single frame based on user interaction with the software application. A method and system transmits, by a processor to a client device, a software application (e.g., a mobile app) configured to load, by a computer processor of the client device, a graphical user interface (GUI), the GUI including a header space and a content display space (e.g., separated by a visual separating element, such as a predetermined number of pixels). The software application is further configured to display, by the computer processor, the GUI in a first frame, detect, by the computer processor, user interaction with content displayed in the content display space of the GUI, compare, by the computer processor, the user interaction with a set of stored user interactions, and, based on the comparing, change, by the computer processor, the header space in the GUI in the first frame.

In one embodiment, the header space includes branding information and/or one or more navigation buttons. The content display space can include an article (having image (s), video, sound, and/or text). The user interaction with the content can include a user scrolling the content. The changing of the header space in the first frame can include displaying the title of the content in the header space. In one embodiment, the software application scrolls the branding information in the header space so that the branding information is no longer displayed in the header space. The changing of the header space can include, for example, changing a characteristic of the header space, such as the size, shape, appearance, content, or some or all of these in combination.

In one embodiment, the software application is configured to assign multiple rows at the top of the GUI as the header space. The software application can create a frame for the header space. In one embodiment, the software application is configured to apply the frame to the header space so that the header space shows one row at a time. The software application can determine if multiple header rows are to be displayed and, if so, generate multiple header rows for the header space if multiple header rows are to be shown. A vertical scroll or other types of user interaction on the mobile device can be assigned as a trigger point for each row in the header space. The scroll position of the frame can be monitored and different rows in the header space can be displayed based on scroll transitions.

In one embodiment, a non-transitory computer readable storage medium is tangibly storing computer program instructions capable of being executed by a computer processor, the computer program instructions defining the steps of: (1) loading, by the computer processor, a graphical user interface (GUI), the GUI comprising a header space and a content display space, (2) displaying, by the computer processor, the GUI in a first frame, (3) detecting, by the computer processor, user interaction with content displayed in the content display space of the GUI, (4) comparing, by the computer processor, the user interaction with a set of stored user interactions, and (5) based on the comparing, changing, by the computer processor, the header space in the GUI in the first frame.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIG. 4 illustrates several screen shots of a graphical user interface displayed by the mobile app in accordance with an embodiment of the present disclosure;

DESCRIPTION OF EMBODIMENTS

Figure 1:
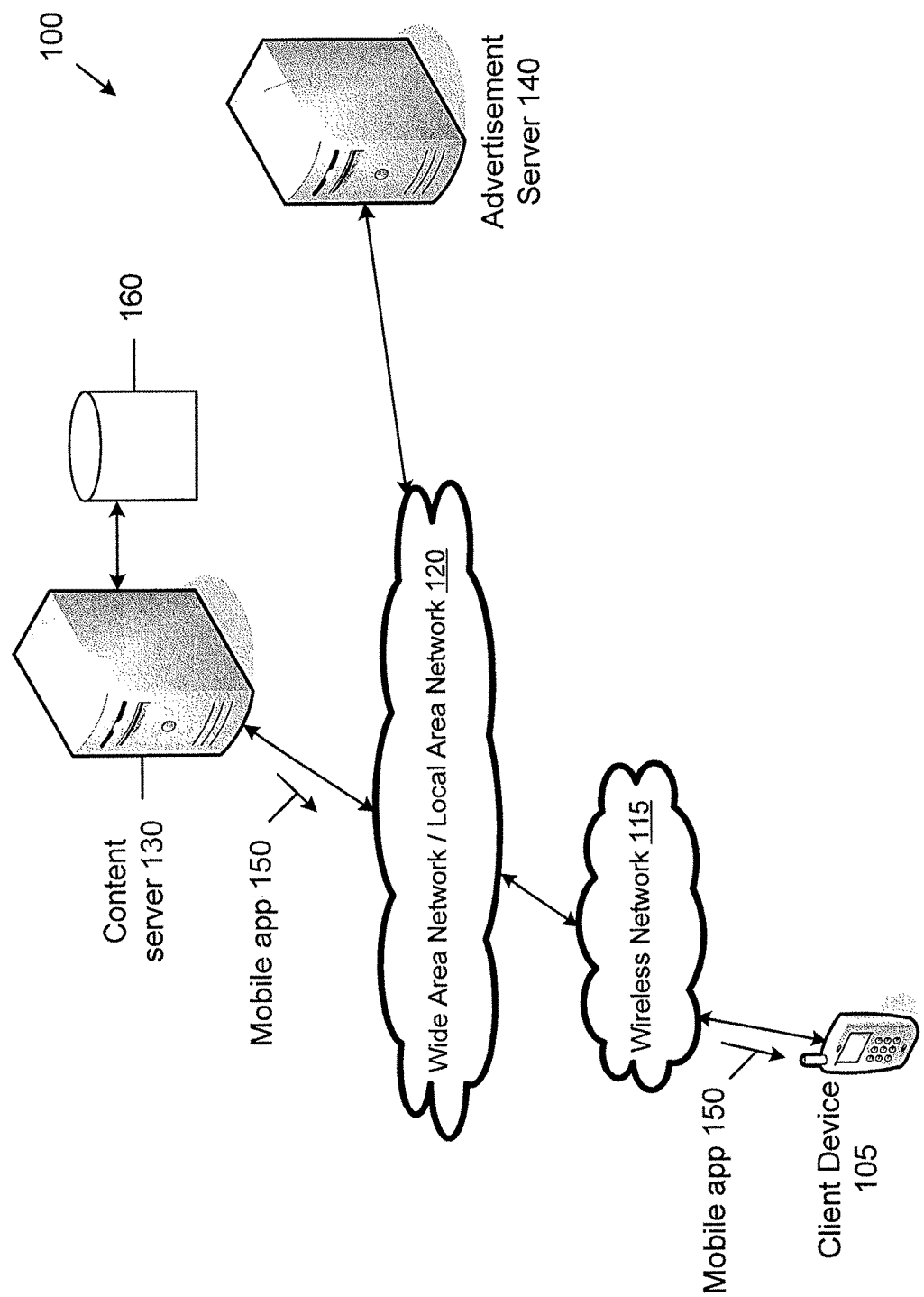
FIG. 1 is a block diagram of a client device communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 is a schematic diagram illustrating an example system 100 of a network and devices implementing embodiments of the present disclosure. Other embodiments that may vary, for example, in terms of arrangement or in terms of type of components, are also intended to be included within claimed subject matter. FIG. 1 includes, for example, a client device 105 in communication with a content server 130 over a wireless network 115 connected to a local area network (LAN)/wide area network (WAN) 120, such as the Internet. Content server 130 is also referred to below as server computer 130 or server 130. In one embodiment, the client device 105 is also in communication with an advertisement server 140. Although shown as a wireless network 115 and WAN/LAN 120, the client device 105 can communicate with servers 130, 140 via any type of network.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Examples of devices that may operate as a content server include desktop computers, multiprocessor systems, microprocessor-type or programmable consumer electronics, etc. Content server 130 may provide a variety of services that include, but are not limited to, web services, third-party services, audio services, video services, email services, instant messaging (IM) services, SMS services, MMS services, FTP services, voice over IP (VOIP) services, calendaring services, photo services, social media services, or the like. Examples of content may include text, images, audio, video, or the like, which may be processed in the form of physical signals, such as electrical signals, for example, or may be stored in memory, as physical states, for example. In one embodiment, the content server 130 hosts or is in communication with a database 160.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, subnetworks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

In one embodiment and as described herein, the client device 105 is a mobile device such as a smartphone. In another embodiment, the client device 105 is a tablet or other computing device.

The server computer 130 transmits a mobile software application (or "app") 150 to the client device 105. In one embodiment, the client device 105 downloads the mobile app 150 (e.g., from an app store or from a web page). In one embodiment, the server computer 130 transmits the mobile app 150 to the client device 105. In one embodiment, the client device 105 includes the mobile app 150 as part of (e.g., pre-installed) software resident on the client device 105.

Figure 2:
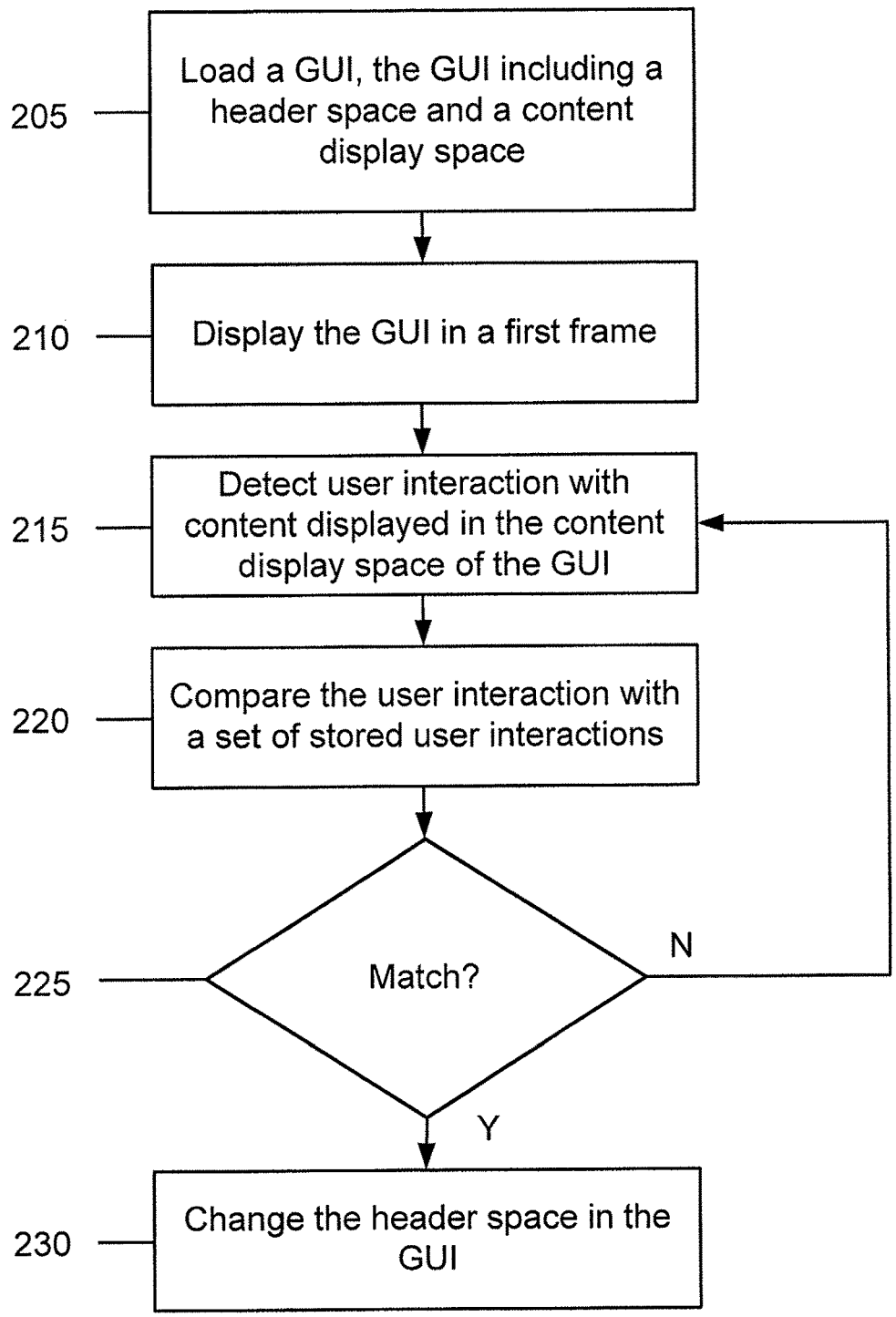
FIG. 2 is a flowchart illustrating steps performed by the client device when executing a mobile app in accordance with an embodiment of the present disclosure.

The client device 105 then executes the mobile app 150. Also referring to FIG. 2, the client device 105 loads a graphical user interface (GUI) during execution of the mobile app 150 (Step 205). The GUI includes a header space (also referred to herein as a header bar or title bar) that is at least initially a predefined number of pixels in width below the top of the screen of the client device 105. As described above, the header bar may include branding information, such as the name of the company that developed the mobile app 150 or the name of the mobile app 150. The header bar may include navigational tools to navigate between screens of the mobile app 150. The GUI also includes a content display space that is separated from the header space (e.g., by a visual separating element, such as by one or more pixels). The content display space includes content associated with the mobile app 150, such as text, an article, a web page, a game, an image, a video, or any other content. The client device 105 displays the GUI in a first frame or first screen associated with the mobile app 150 (Step 210).

In one embodiment, the user interacts with the content in the content display space of the GUI. For example, the user may tap content on the screen, may swipe the screen up or down (e.g., to scroll the content up or down to, for instance, see more content or see previously viewed content). The user may swipe the content sideways. The user may touch the screen or may use a pointing device on the screen. In one embodiment, the user may move his or her hand or finger(s) near the screen to affect the content of the screen. The mobile app 150 detects user interaction with the content (Step 215). The user interaction with the content includes any interaction with the content. Once a user interaction is detected in Step 215, the mobile app 150 compares the detected user interaction with a set of stored user interactions (Step 220). In one embodiment, the set of stored user interactions are stored in the client device 105. In another embodiment, the server 130 stores the set of stored user interactions and the mobile app 150 communicates with the server 130 to perform this comparison. In one embodiment, database 160 in communication with the server 130 (or client device 105) stores the set of stored user interactions.

The mobile app 150 determines, from this comparison, whether a match exists between one or more user interactions in the set of stored user interactions and the detected user interaction (Step 225). If a match does not exist, the process returns to Step 215. If a match does exist, the mobile app 150 changes the header space in the GUI in the first frame. For example and as described in more detail below, instead of showing branding information in the header space, the mobile app 150 may display a title of an article that is being displayed in the content display space. Therefore, as the user scrolls the content of the article upwards to read more of the article, instead of the title of the article disappearing due to the user's scrolling, the title of the article can be displayed in the header bar so that the title is displayed even when the user is reading further down in the article.

Thus, in a single frame, the header space changes dynamically (either by changing size, shape, appearance, content, or some or all of these in combination) in response to user interaction with the content in the content display space. In one embodiment, in a single frame, the header space changes dynamically in response to user interaction with the header space.

Figure 3:
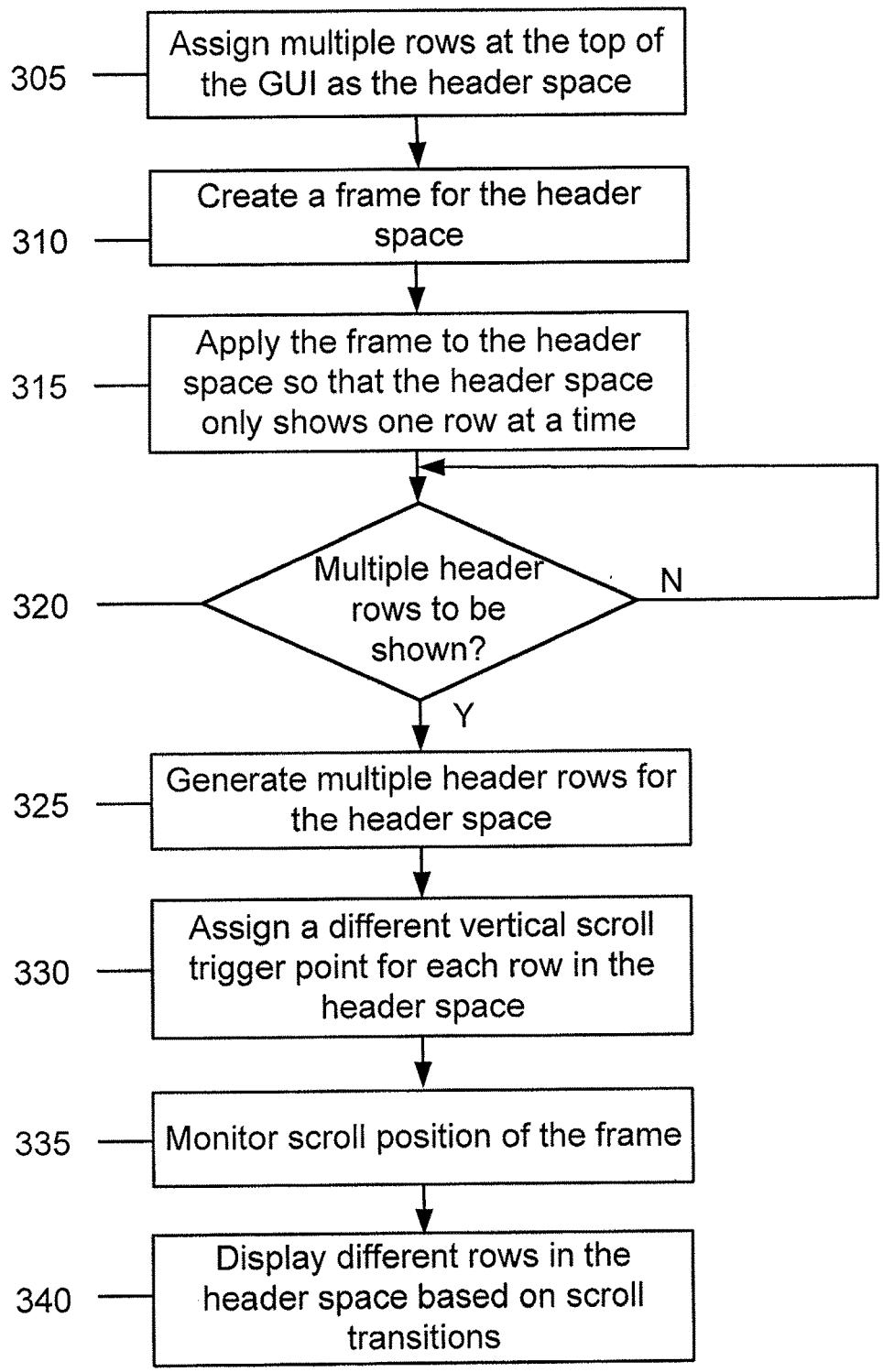
FIG. 3 is a flowchart illustrating steps performed by the client device when executing the mobile app in accordance with an embodiment of the present disclosure.

FIG. 3 is a flowchart illustrating an embodiment of steps performed by the client device 105 when executing the mobile app 150. The mobile app 150 assigns multiple rows at the top of the GUI as the header space (Step 305). The mobile app 150 creates a frame for the header space (Step 310) that, in one embodiment, obscures or crops the contents outside of the frame. In one embodiment, the mobile app 150 applies the frame to the header space so that the header space only shows one row at a time (Step 315). In one embodiment, when a user navigates to a page or frame upon which multiple header rows are to be shown (Step 320), the mobile app 150 generates multiple header rows for the header space (Step 325). The mobile app 150 then assigns a different vertical scroll trigger point (or any other user interaction can be assigned as a trigger point) for each row in the header space (Step 330). In one embodiment, the scroll trigger points are based on the contents in the frame. For example, suppose the title of a news article is located at 300 pixels below the top of the frame. The mobile app 150 can assign the scroll trigger point to be 300 pixels for the second row in the header space. Suppose also that the height of the header space is 50 pixels.

In one embodiment, the mobile app 150 monitors the scroll position of the frame (e.g., how much has the content been scrolled downward from a predetermined point, such as the top of the content) (Step 335). The mobile app 150 can then display different rows in the header space based on corresponding scroll transitions (Step 340). For example, when a user scrolls from 300 pixels to 301 pixels, the mobile app 150 can scroll the header space down 1 pixel so that 1 pixel of the second row in the header space is displayed while the bottom 49 pixels of the first row of the header space is still shown in the header space. If the user scrolls to 310 pixels, the mobile app 150 scrolls the header space by 10 pixels.

There can be multiple trigger points in the frame or page, for more than two rows in the header space. For example, there can be three rows in the header space, and they can have scroll points 300 and 600 assigned to them. The height of the header space can be 50 pixels. So when a user is at scroll position 600, the header scroll position is at 50, and only row 2 is shown in the header space. When the user scrolls to 610, the header would be at scroll position 60 (i.e., 10 pixels of row 3 in the header space is revealed at the bottom, while the bottom 40 pixels of the bottom of row 2 is shown.

The above examples are for vertical header rows. In another embodiment, the header space can have horizontal header columns corresponding to horizontal scrolling of the page, with similar trigger point concepts.

Figure 4:
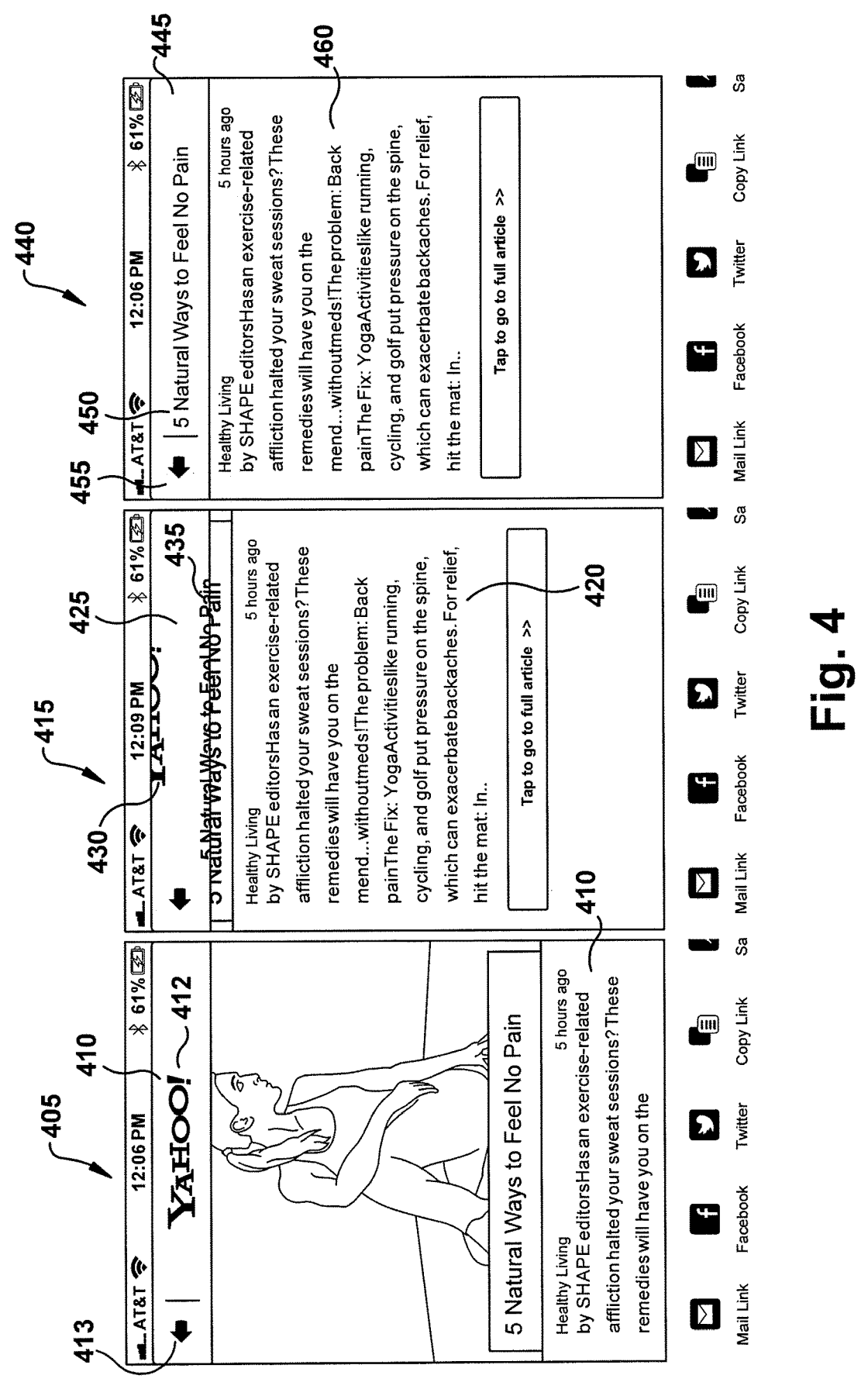

FIG. 4 illustrates several screen shots of a mobile application displayed by the client device 105. A first screen shot 405 displays a mobile GUI in which a header space 410 includes a branding element "Yahoo!" 412 and a navigation button 413 to navigate back one page. A content display space 410 displays an article titled "5 Natural Ways to Feel No Pain". A second screen shot 415 shows the user scrolling the article up to read more content in the content display space 420. In one embodiment, the scrolling of the content in the content display space 420 causes the content to scroll upward and also causes the header space 425 to scroll upward. As can be seen in the header space 425, the branding element "Yahoo!" 430 has been scrolled upward and the title of the article 435 has started to be shown in the header space 425. The third screen shot 440 shows the header space 445 now only displaying the title of the article 450 and a navigation button 455. The branding element "Yahoo!" has been scrolled out of the header space 445. Thus, in one embodiment, the user can scroll the content of the article upwards in content display space 460 but the title of the article can be displayed during this scrolling. This can enable the user to view the title of the article even after scrolling the content. Thus, the header space dynamically changes in response to user interaction with the content display space in a single frame or page.

Figure 5A:
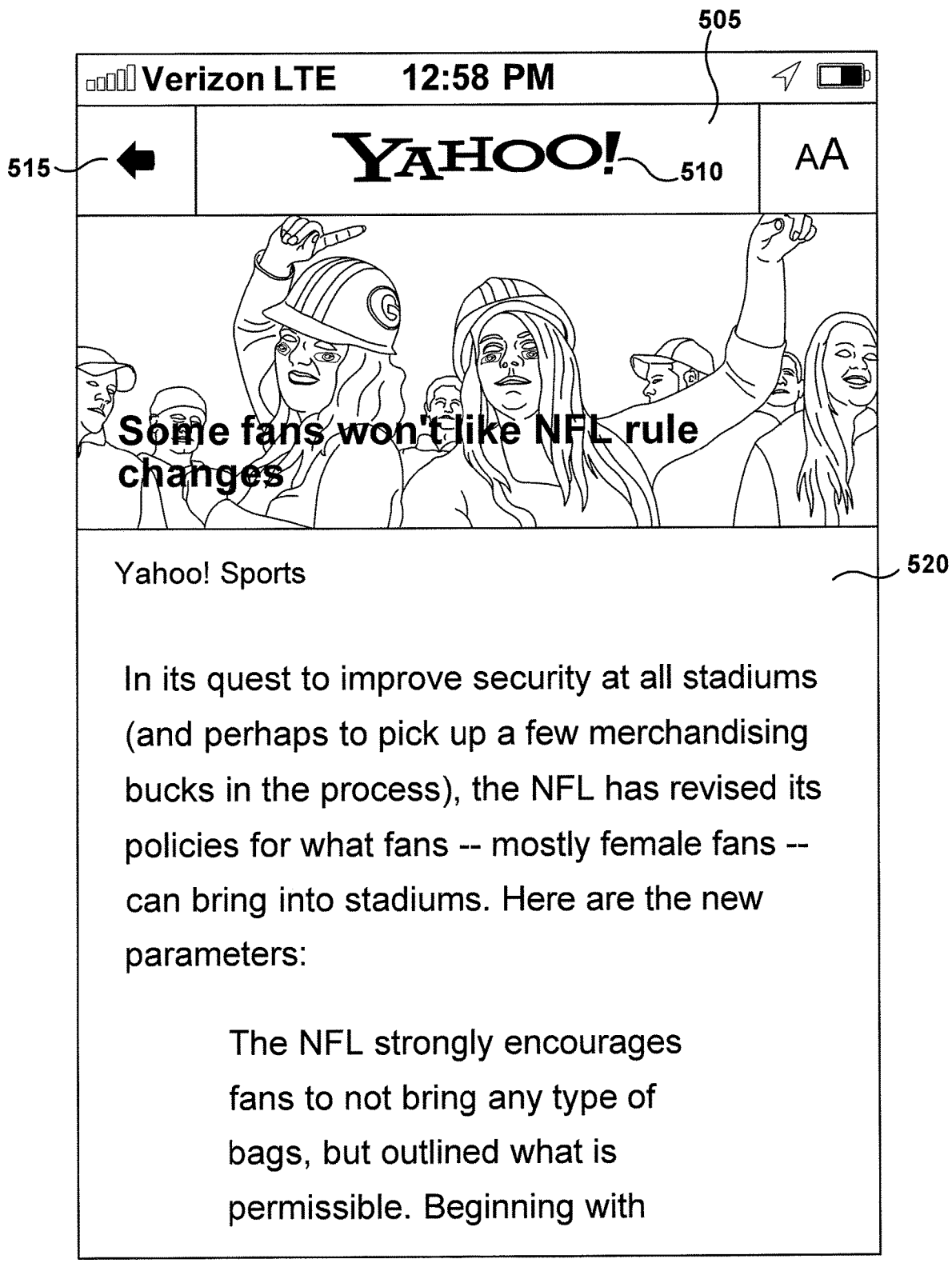
FIGS. 5A-5E illustrate examples of a graphical user interface displayed by the mobile app in accordance with an embodiment of the present disclosure.
Figure 5B:
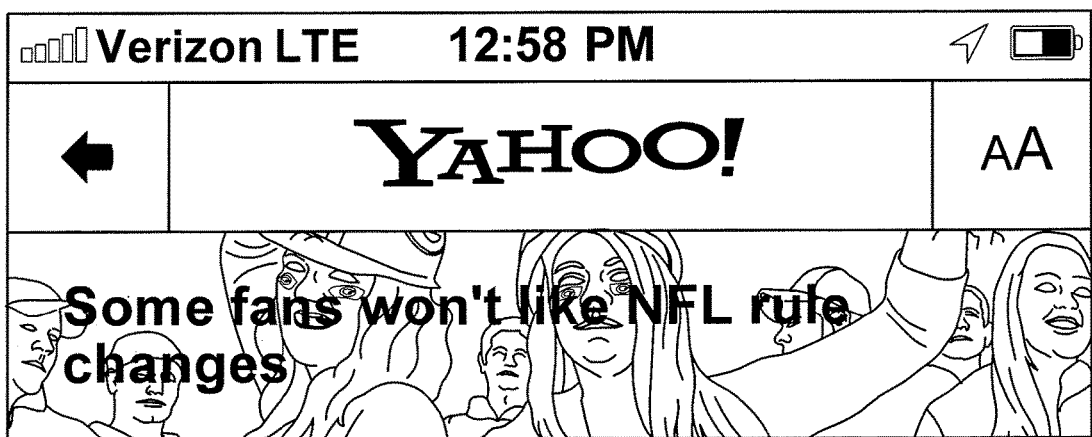
Figure 5C:
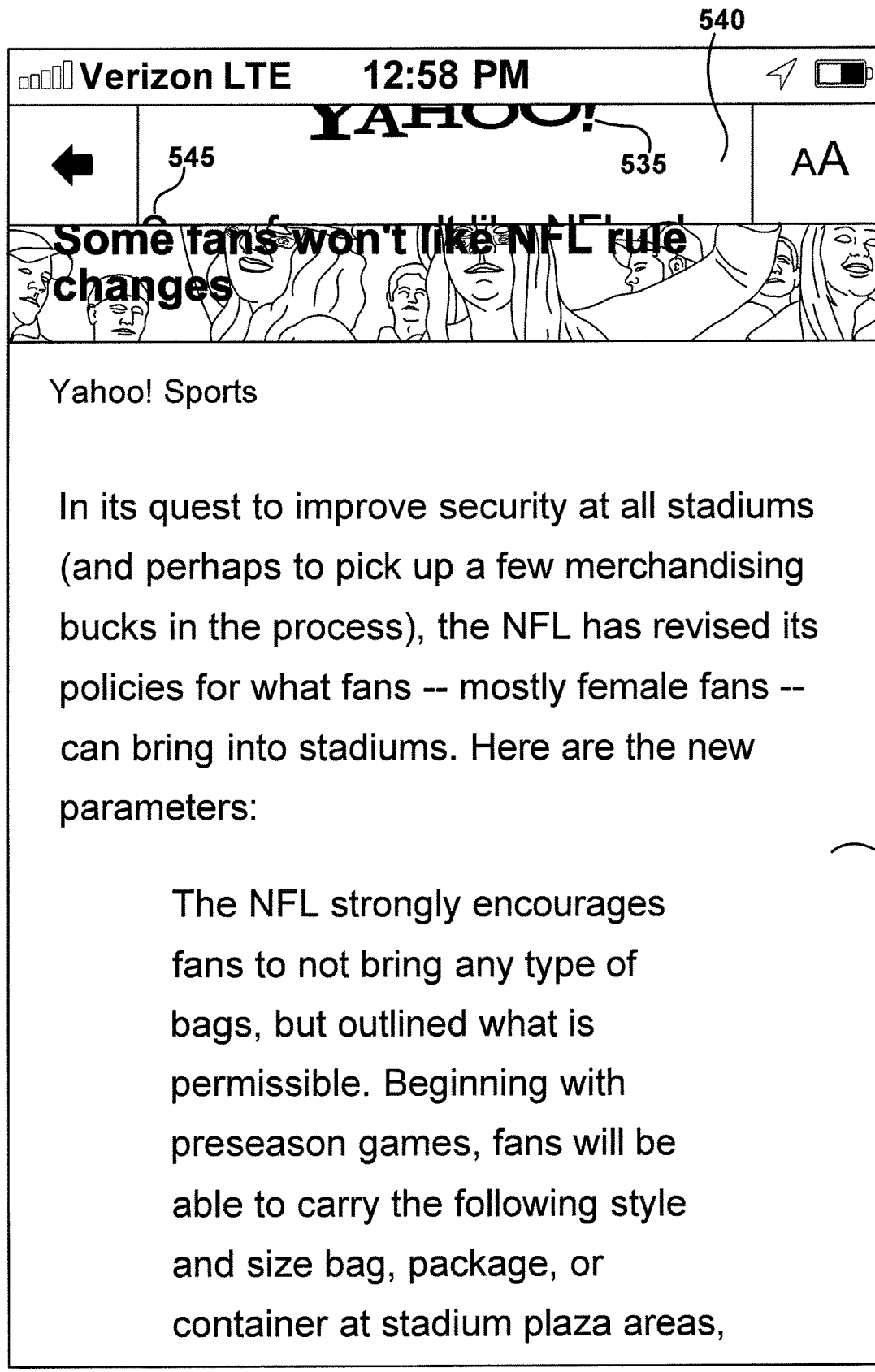
Figure 5D:
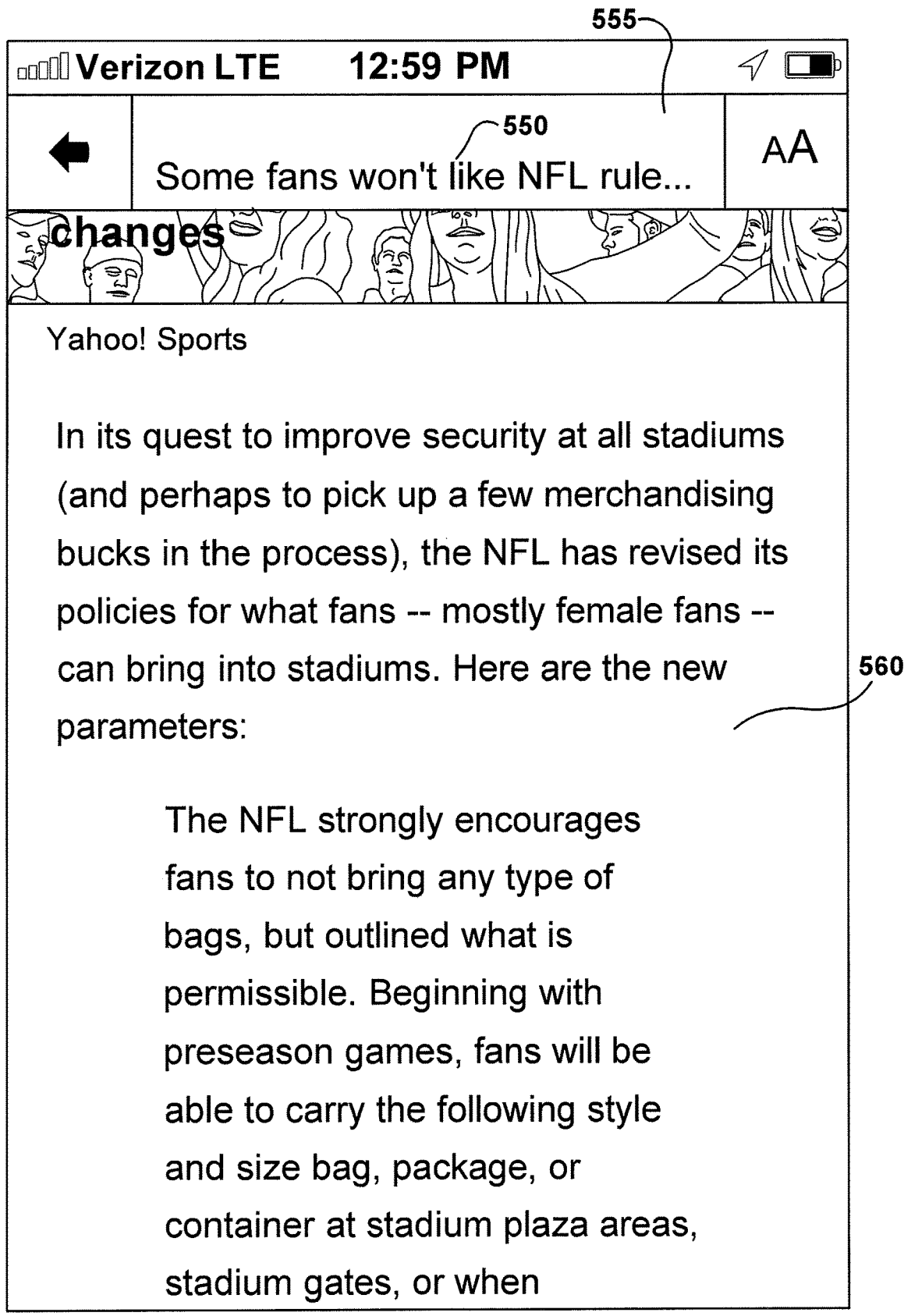
Figure 5E:
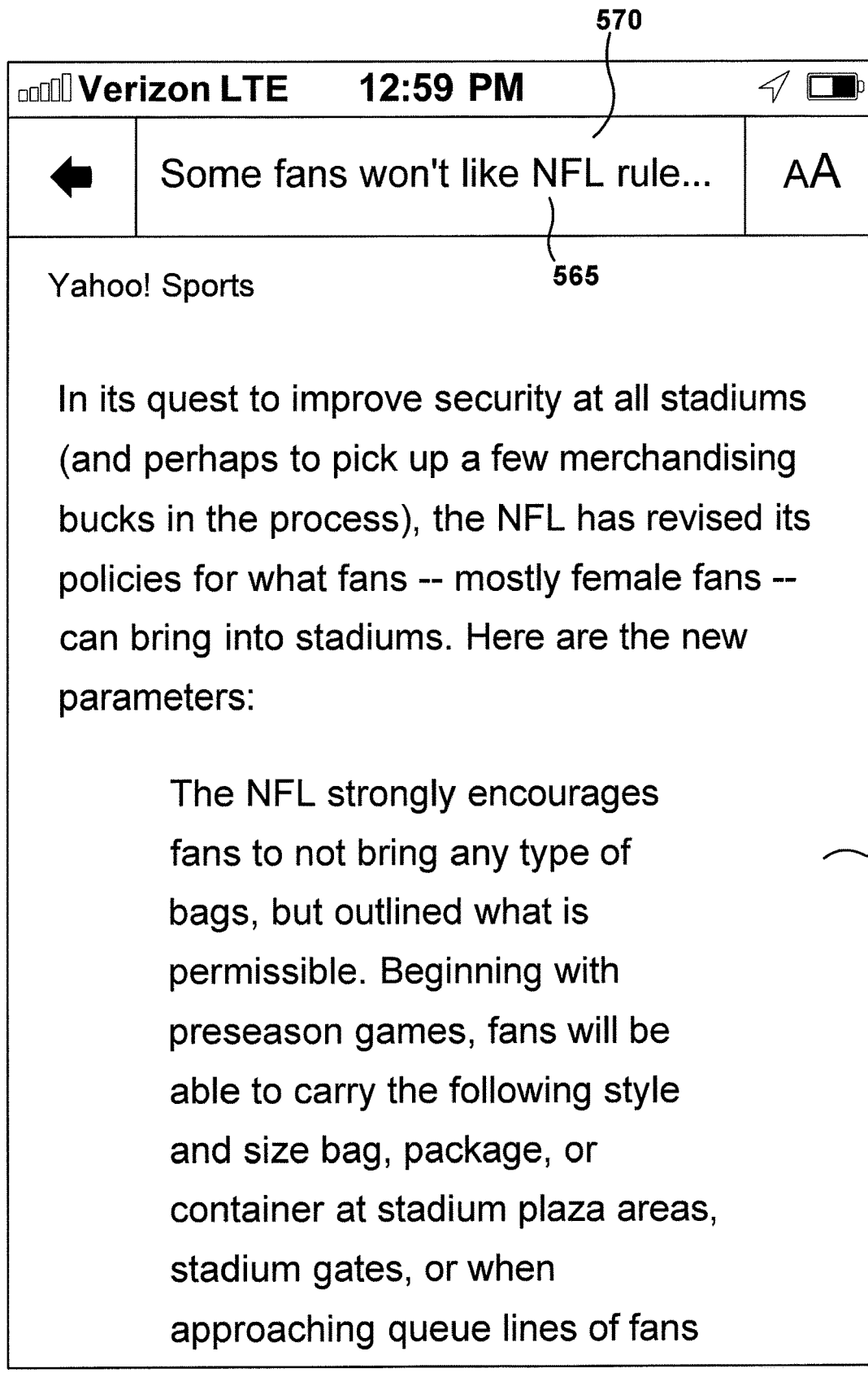

FIGS. 5A-5E illustrate examples of the GUI displayed by the mobile app 150 in a single frame. In FIG. 5A, a header space 505 includes a branding element "Yahoo!" 510 and a navigation button 515 to navigate to a previous page. A content display space 520 displays an article titled "Some fans won't like the NFL rule changes". FIG. 5B shows the user starting to scroll the content in the content display space 525 upward. FIG. 5C shows the user continuing to scroll the content in content display space 530 upward, which is resulting in the branding element "Yahoo!" 535 in header space 540 scrolling upward as well. The title 545 of the article is starting to appear in the header space 540. FIG. 5D shows the title 550 of the article being displayed in the header space 555 while the branding element previously displayed in the header space 555 is no longer displayed (as the content in the content display space 560 is scrolled upward). FIG. 5E shows the title of the article 565 being displayed in the header space 570 and the content in the content display space 575 being displayed with the previously shown title image scrolled out of view in the content display space 575.

Although described with displaying the title of an article, the header space can be dynamically updated in response to user interaction in a single frame in a variety of ways. For example, the header space can provide contextual information or contextual control based on user interaction with the content display space. In one embodiment, the header space can display a tab button or jump button in response to user interaction. For example, in an app store, a tab button may be displayed to show reviews of an app or of content. This tab button (or jump button) may be displayed in the header space in response to a user scrolling content describing the app of interest.

Although described herein as a mobile app, in another embodiment the header space of a web page changes dynamically based on user interaction with content displayed in a content display space of the web page in a single frame or page. For example, the branding information in a header space of a single web page of a web site (e.g., yahoo.com) may change dynamically based on user interaction with the content of the web page.

Figure 6:
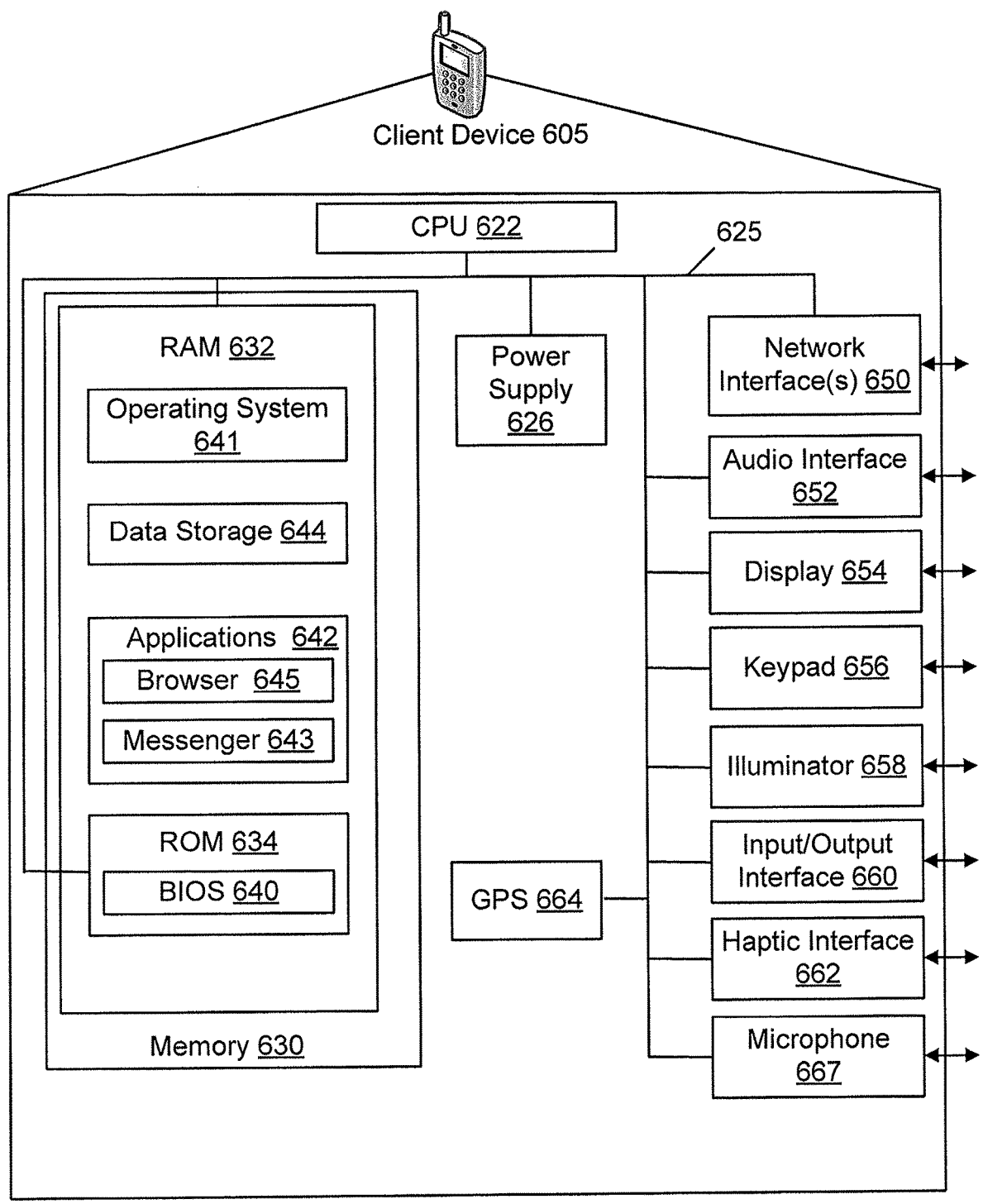
FIG. 6 depicts one example of a schematic diagram illustrating a client device in accordance with an embodiment of the present disclosure.

As shown in the example of FIG. 6, client device 605 may include one or more processing units (also referred to herein as CPUs) 622, which interface with at least one computer bus 625. A memory 630 can be persistent storage and interfaces with the computer bus 625. The memory 630 includes RAM 632 and ROM 634. ROM 634 includes a BIOS 640. Memory 630 interfaces with computer bus 625 so as to provide information stored in memory 630 to CPU 622 during execution of software programs such as an operating system 641, application programs 642, device drivers, and software modules 643, 645 that comprise program code, and/or computer-executable process steps, incorporating functionality described herein, e.g., one or more of process flows described herein. CPU 622 first loads computer-executable process steps from storage, e.g., memory 632, data storage medium/media 644, removable media drive, and/or other storage device. CPU 622 can then execute the stored process steps in order to execute the loaded computer-executable process steps. Stored data, e.g., data stored by a storage device, can be accessed by CPU 622 during the execution of computer-executable process steps.

Persistent storage medium/media 644 is a computer readable storage medium(s) that can be used to store software and data, e.g., an operating system and one or more application programs. Persistent storage medium/media 644 can also be used to store device drivers, such as one or more of a digital camera driver, monitor driver, printer driver, scanner driver, or other device drivers, web pages, content files, playlists and other files. Persistent storage medium/media 606 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Client device 605 can also include one or more of a power supply 626, network interface 650, audio interface 652, a display 654 (e.g., a monitor or screen), keypad 656, illuminator 658, I/O interface 660, a haptic interface 662, a GPS 664, a microphone 667, a video camera, TV/radio tuner, audio/video capture card, sound card, analog audio input with A/D converter, modem, digital media input (HDMI, optical link), digital I/O ports (RS232, USB, FireWire, Thunderbolt), expansion slots (PCMCIA, ExpressCard, PCI, PCIe).

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Figure 7:
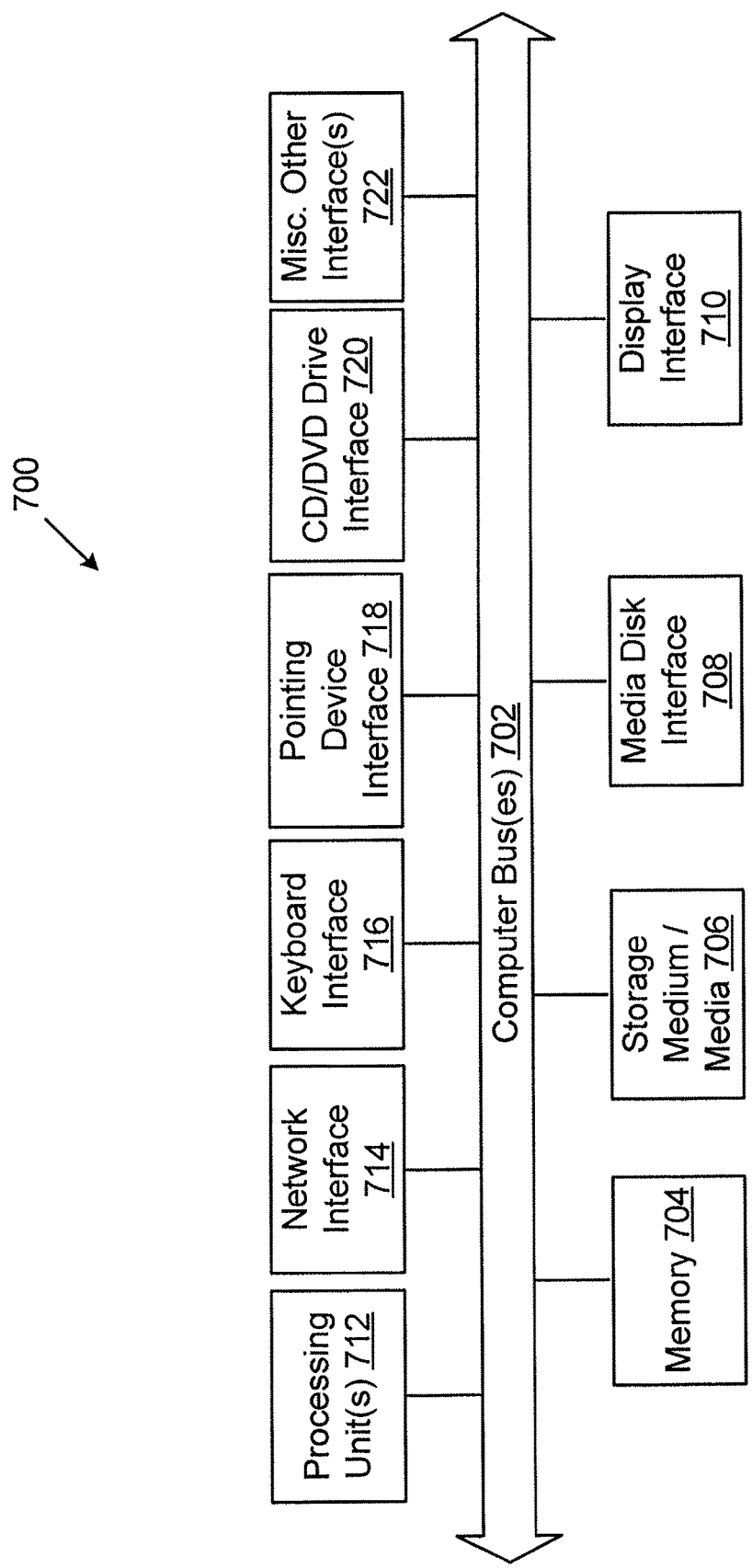
FIG. 7 is a block diagram illustrating an internal architecture of a computer in accordance with an embodiment of the present disclosure.

FIG. 7 is a block diagram illustrating an internal architecture of an example of a computer, such as server computer 130 and/or client device 105, in accordance with one or more embodiments of the present disclosure. A computer as referred to herein refers to any device with a processor capable of executing logic or coded instructions, and could be a server, personal computer, set top box, tablet, smart phone, pad computer or media device, to name a few such devices. As shown in the example of FIG. 7, internal architecture 700 includes one or more processing units (also referred to herein as CPUs) 712, which interface with at least one computer bus 702. Also interfacing with computer bus 702 are persistent storage medium/media 706, network interface 714, memory 704, e.g., random access memory (RAM), run-time transient memory, read only memory (ROM), etc., media disk drive interface 708 as an interface for a drive that can read and/or write to media including removable media such as floppy, CD-ROM, DVD, etc. media, display interface 710 as an interface for a monitor or other display device, keyboard interface 716 as interface for a keyboard, pointing device interface 718 as an interface for a mouse or other pointing device, and miscellaneous other interfaces not shown individually, such as parallel and serial port interfaces, a universal serial bus (USB) interface, and the like.

Memory 704 interfaces with computer bus 702 so as to provide information stored in memory 704 to CPU 712 during execution of software programs such as an operating system, application programs, device drivers, and software modules that comprise program code, and/or computer-executable process steps, incorporating functionality described herein, e.g., one or more of process flows described herein. CPU 712 first loads computer-executable process steps from storage, e.g., memory 704, storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

As described above, persistent storage medium/media 706 is a computer readable storage medium(s) that can be used to store software and data, e.g., an operating system and one or more application programs. Persistent storage medium/media 706 can also be used to store device drivers, such as one or more of a digital camera driver, monitor driver, printer driver, scanner driver, or other device drivers, web pages, content files, playlists and other files. Persistent storage medium/media 706 can further include program modules and data files used to implement one or more embodiments of the present disclosure.

Internal architecture 700 of the computer can include (as stated above), a microphone, video camera, TV/radio tuner, audio/video capture card, sound card, analog audio input with A/D converter, modem, digital media input (HDMI, optical link), digital I/O ports (RS232, USB, FireWire, Thunderbolt), and/or expansion slots (PCMCIA, ExpressCard, PCI, PCIe).

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A non-transitory computer readable storage medium tangibly storing computer program instructions, that when executed by a computer processor, perform a method comprising:
   loading, by the computer processor, a graphical user interface (GUI) associated with a mobile application, the GUI comprising a single header space and a content display space for displaying content, said header space as displayed comprising a size and a shape at a location in the GUI;
   displaying, by the computer processor, the GUI in a first frame of the mobile application;
   detecting, by the computer processor, user interaction with content displayed in the content display space of the GUI;
   comparing, by the computer processor, the user interaction with a set of stored user interactions; and
   dynamically modifying, based on said comparison and in response to said user interaction, and without user input on or within the header space, via the computer processor, the header space in the GUI in the first frame, said modification causing a portion of the displayed content within the content display space to disappear from the content display space and reappear as displayed within the modified header space such that content previously existing in the header space is replaced by said portion, said modified header space maintaining the size, the shape and the location within said first frame as said header space prior to said modification.

2. The non-transitory computer readable storage medium of claim 1, wherein the header space comprises branding information.

3. The non-transitory computer readable storage medium of claim 1, wherein the header space comprises a navigation button.

4. The non-transitory computer readable storage medium of claim 1, wherein the changing of the header space further comprises changing a characteristic of the header space in a group of characteristics consisting of size, shape, appearance, and content.

5. The non-transitory computer readable storage medium of claim 1, wherein the user interaction with the content further comprising a user scrolling the content.

6. The non-transitory computer readable storage medium of claim 5, wherein the changing of the header space in the first frame further comprises displaying a title of the content in the header space.

7. The non-transitory computer readable storage medium of claim 6, further comprising scrolling the branding information in the header space so that the branding information is no longer displayed in the header space.

8. The non-transitory computer readable storage medium of claim 1, further comprising assigning, by the computer processor, multiple rows at the top of the GUI as the header space.

9. The non-transitory computer readable storage medium of claim 8, further comprising assigning, by the computer processor, a trigger point for each row in the header space.

10. The non-transitory computer readable storage medium of claim 9, further comprising displaying, by the computer processor, different rows in the header space based on scroll transitions.

11. A method comprising:
    transmitting, by a server computer, a software application to a client device, the software application causes the client device to:
    load, by a computer processor of the client device, a graphical user interface (GUI) associated with the software application, the GUI comprising a single header space and a content display space for displaying content, said header space as displayed comprising a size and a shape at a location in the GUI;
    display, by the computer processor, the GUI in a first frame of the software application;
    detect, by the computer processor, user interaction with content displayed in the content display space of the GUI;
    compare, by the computer processor, the user interaction with a set of stored user interactions; and
    dynamically modifying, based on said comparison and in response to said user interaction, and without user input on or within the header space, via the computer processor, the header space in the GUI in the first frame, said modification causing a portion of the displayed content within the content display space to disappear from the content display space and reappear as displayed within the modified header space such that content previously existing in the header space is replaced by said portion, said modified header space maintaining the size, the shape and the location within said first frame as said header space prior to said modification.

12. The method of claim 11, wherein the user interaction with the content further comprises a user scrolling the content.

13. The method of claim 12, wherein the software application configured to change the header space further comprises the software application being configured to display a title of the content in the header space.

14. The method of claim 11, wherein the software application is further configured to assign, by the computer processor, multiple rows at the top of the GUI as the header space.

15. The method of claim 14, wherein the software application is further configured to create, by the computer processor, a frame for the header space.

16. The method of claim 15, wherein the software application is further configured to apply the frame to the header space so that the header space shows one row at a time.

17. The method of claim 16, wherein the software application is further configured to determine if multiple header rows are to be displayed.

18. The method of claim 17, wherein the software application is further configured to generate multiple header rows for the header space if multiple header rows are to be shown.

19. The method of claim 18, wherein the software application is further configured to assign a trigger point for each row in the header space.

20. The method of claim 19, wherein the software application is further configured to monitor scroll position of the frame.

21. The method of claim 20, wherein the software application is further configured to display different rows in the header space based on scroll transitions.

22. The method of claim 11, wherein the software application configured to change the header space further comprises the software application being configured to change a characteristic of the header space in a group of characteristics consisting of size, shape, appearance, and content.

23. A server computer comprising:
a processor; and
a non-transitory computer-readable storage medium for tangibly storing thereon program logic for execution by the processor, the program logic comprising:
transmitting logic executed by the processor for transmitting a software application to a client device, the software application configured to:
load, by a computer processor of the client device, a graphical user interface (GUI) associated with the software application, the GUI comprising a single header space and a content display space for displaying content, said header space as displayed comprising a size and a shape at a location in the GUI;
display, by the computer processor, the GUI in a first frame of the software application;
detect, by the computer processor, user interaction with content displayed in the content display space of the GUI;
compare, by the computer processor, the user interaction with a set of stored user interactions; and
dynamically modifying, based on said comparison and in response to said user interaction, and without user input on or within the header space, via the computer processor, the header space in the GUI in the first frame, said modification causing a portion of the displayed content within the content display space to disappear from the content display space and reappear as displayed within the modified header space such that content previously existing in the header space is replaced by said portion, said modified header space maintaining the size, the shape and the location within said first frame as said header space prior to said modification.

24. The server computer of claim 23, wherein the software application configured to change the header space further comprises the software application being configured to change a characteristic of the header space in a group of characteristics consisting of size, shape, appearance, and content.

* * * * *